UNITED STATES PATENT OFFICE.

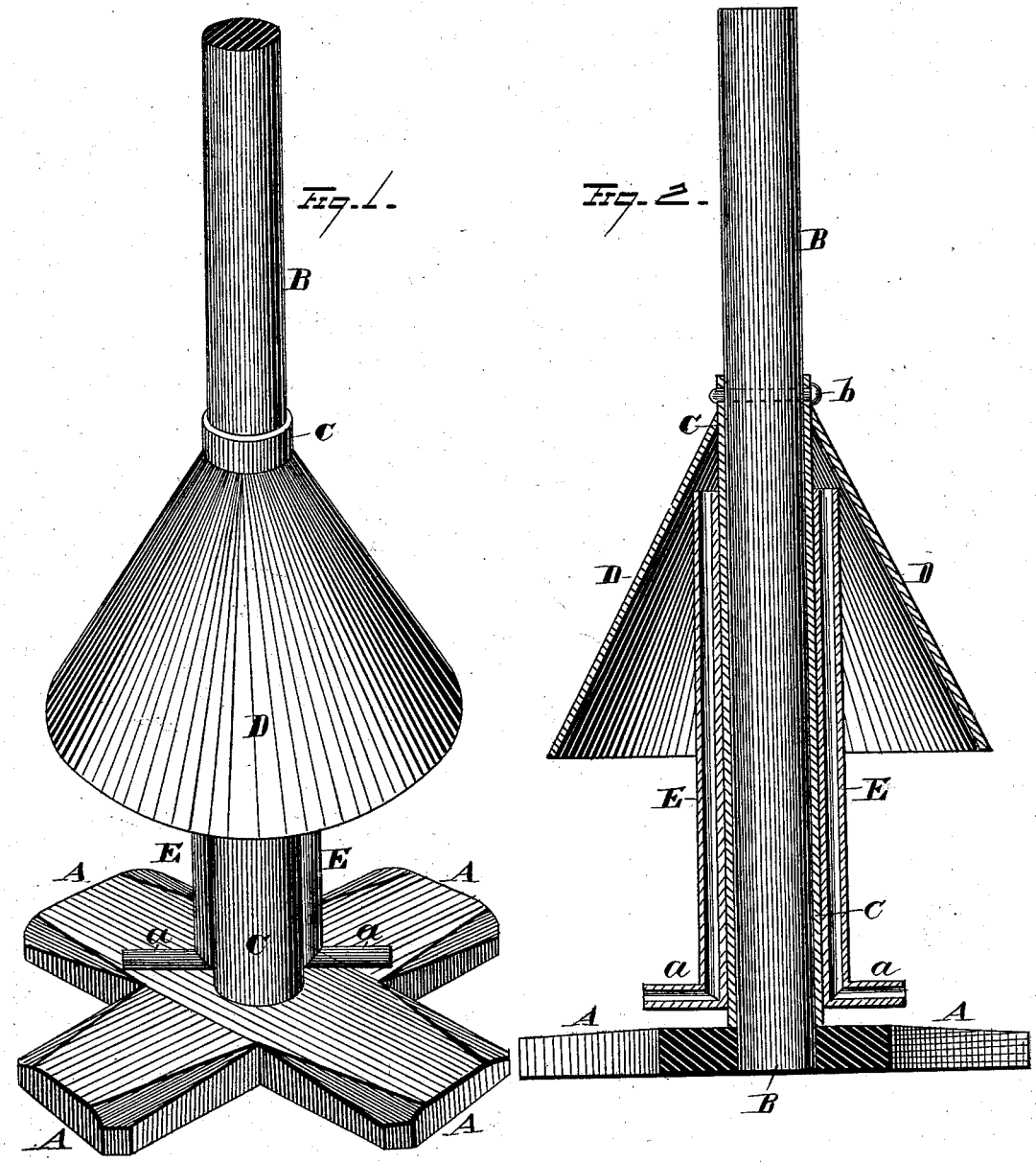

WILLIAM B. ALLEN, OF ORLEANS, NEW YORK.

IMPROVEMENT IN CHURN-DASHERS.

Specification forming part of Letters Patent No. 209,442, dated October 29, 1878; application filed September 5, 1878.

*To all whom it may concern:*

Be it known that I, WILLIAM B. ALLEN, of Orleans, in the county of Ontario and State of New York, have invented certain new and useful Improvements in Churn-Dashers; and I do hereby declare the following to be a full, clear, and exact description of the invention, such as will enable others skilled in the art to which it pertains to make and use it, reference being had to the accompanying drawings, which form part of this specification.

My invention relates to an improvement in churn-dashers.

The object of the invention is to provide a churn-dasher of such construction that fine jets of air will be forced under pressure into the lower portion of the body of cream in the churn when the dasher is being operated, and thus cause the particles of cream to be subjected to constant currents of air, which has the effect to rapidly convert the cream into butter.

My invention consists, in combination with suitable dasher-blades, of an inverted air-receptacle and air-conduits leading from near the upper portion of such air-receptacle down to or near the dasher-blades, whereby the dasher, when forced down into the churn, operates to compress the air in the air-receptacle, and force the air therefrom through the air-conduits downwardly into the cream in fine jets under pressure.

My invention further consists in the several details in construction and combinations of parts, as will hereinafter be described, and pointed out in the claims.

In the accompanying drawings, Figure 1 is a view, in perspective, of my improved churn-dasher. Fig. 2 is a vertical section of the same.

A represents the blades of a churn-dasher, having a handle, B, secured thereto in any desired manner. C is a sleeve, made of tin or other suitable sheet metal, to the upper end of which is attached an inverted conical air-receptacle, D. Small air tubes or conduits E, of any desired number, are attached to the sleeve C, and extend upwardly within the inverted air-receptacle D, nearly to the top of same, and lead down close to the dasher A, at which point the tubes are provided with lateral branches $a$. The sleeve C fits over the handle, the lower end resting on the dashers, while the upper end is secured to the handle by a pin or rivet, $b$. When the dasher is forced through its downstroke, the lower edge of the inverted cone will be submerged in the cream, thus forming a liquid seal about the lower end of the air-receptacle. As the air contained in the inverted cone cannot escape around the lower edge thereof, it is compressed within the upper portion of the cone as the dasher is being forced downwardly into the cream, and from thence forced into and through the small air-conduits, from which the air issues in small jets and mingles with the cream in its ascent to the surface. The lateral branches of the air-conduits prevent the cream from being forced upwardly therein to any appreciable extent when the dasher is forced through its downstroke, and hence no obstruction is offered to the flow of air.

My improvement is of small first cost, and is adapted to be readily attached to any ordinary churn-dasher. It is evident that the invention is susceptible of being embodied in varied forms of construction—as, for instance, the sleeve may be of greater diameter than that of the handle, and an annular air-conduit formed therein, which conduit may be single or subdivided into any desired number of separate passages by radial wings extending the entire length of the sleeve, their inner edges resting against the handle. The upper end of the sleeve is provided with a collar, to prevent any escape of air from between the sleeve and handle. The upper end of the sleeve, at a point within the inverted cone, is provided with any desired number of perforations, for the admission of the compressed air from the inverted cone, and the lower end provided with branch jet-pipes to allow the air to escape into the body of the cream in fine jets.

In the foregoing remarks I do not limit myself to the exact construction shown and described; but, Having fully described my invention, what I claim as new, and desire to secure by Letters Patent, is—

1. The combination, with the handle and blades of a churn-dasher, of an inverted air-chamber and air-conduits leading from within and near the upper end of said air-chamber downwardly to a point near the dasher-blades, substantially as set forth.

2. The combination, with the handle and blades of a churn-dasher, of an inverted conical air-receptacle and air-conduits leading from within and near the upper end of said receptacle downwardly to a point near the blades of the dasher, substantially as set forth.

3. The combination, with the handle and blades of a churn-dasher, of a sleeve or tube having an inverted air-receptacle attached to its upper end, and air-conduits leading downwardly to a point near the dasher-blades, substantially as set forth.

4. The combination, with the handle and blades of a churn-dasher, of an inverted air-receptacle and air-conduits extending from near the dasher-blades upwardly into the air-receptacle, the lower end or ends of said air-conduits provided with lateral branches, substantially as set forth.

In testimony that I claim the foregoing I have hereunto set my hand and seal this 2d day of September, 1878.

WILLIAM B. ALLEN. [L. S.]

Witnesses:
  CHAS. H. KELLEY,
  F. S. WILDER.